United States Patent
Shelby

(10) Patent No.: US 12,250,177 B2
(45) Date of Patent: Mar. 11, 2025

(54) FLEXIBLE DIPLEXER WITH DYNAMICALLY CONFIGURABLE BAND-SPLIT IN HYBRID FIBER COAX DEPLOYMENTS

(71) Applicant: Coherent Logix, Incorporated, Austin, TX (US)

(72) Inventor: Kevin A. Shelby, Austin, TX (US)

(73) Assignee: HyperX Logic, Inc., Austin, TX (US)

( * ) Notice: Subject to any disclaimer, the term of this patent is extended or adjusted under 35 U.S.C. 154(b) by 0 days.

(21) Appl. No.: 18/353,974

(22) Filed: Jul. 18, 2023

(65) Prior Publication Data

US 2024/0195597 A1    Jun. 13, 2024

Related U.S. Application Data

(63) Continuation of application No. 17/307,449, filed on May 4, 2021, now abandoned.

(60) Provisional application No. 63/020,094, filed on May 5, 2020.

(51) Int. Cl.
    *H04L 5/14*     (2006.01)
(52) U.S. Cl.
    CPC ..................................... *H04L 5/14* (2013.01)
(58) Field of Classification Search
    CPC ......... H04L 5/14; H04L 5/1461; H04L 12/00; H04L 12/50; H04L 23/00
    See application file for complete search history.

(56) References Cited

U.S. PATENT DOCUMENTS

| | | | | |
|---|---|---|---|---|
| 10,090,867 B2* | 10/2018 | Williams | ............... | H04L 5/1461 |
| 10,615,875 B2* | 4/2020 | Mutalik | ........... | H04B 10/25751 |
| 11,296,911 B2* | 4/2022 | Finkelstein | ......... | H04L 12/6418 |
| 2013/0137475 A1* | 5/2013 | Rousu | ................... | H04W 60/04 |
| | | | | 455/509 |
| 2013/0294462 A1* | 11/2013 | Chang | ................ | H04L 12/2801 |
| | | | | 370/497 |
| 2014/0030979 A1* | 1/2014 | Bowman | ................ | H04B 15/00 |
| | | | | 455/39 |

(Continued)

*Primary Examiner* — Bailor C Hsu
(74) *Attorney, Agent, or Firm* — Kowert, Hood, Munyon, Rankin & Goetzel, P.C.; Jeffrey C. Hood; Luke Langsjoen

(57) ABSTRACT

A flexible diplexer may include a programmably reconfigurable filter pair capable of rendering a variety of band-split arrangements in a digital signal processor (DSP) backed design in hybrid fiber coaxial cable plant/system deployments. The flexible diplexers may thereby meet a larger range of band-split requirements, including the full range of band-split requirements. Configurability may be achieved by digitizing the signal at either input interface of a diplexer in a diplexer/amplifier complex after bandpass filtering, and two-to-four wire conversion at the respective forward (e.g. downstream) and reverse (e.g. upstream) input interfaces. A new band-split may be obtained by updating the digital filters using specified coefficient sets determined off-line and retrieved from memory. The flexible diplexer/amplifier complex may enable the implementation of additional functionality including equalization and tilt regeneration, self-interference cancellation, virtual segmentation, and/or creation of auxiliary service points to provide access to/from a small cell base station and/or Wi-Fi access point.

20 Claims, 16 Drawing Sheets

(56) References Cited

U.S. PATENT DOCUMENTS

2015/0334186 A1\* 11/2015 Chen ................... H04L 12/6418
           348/143
2019/0081661 A1\* 3/2019 Krapp ................... H04L 5/1461

\* cited by examiner

Node + 0 Configuration

FLEXIBLE DIPLEXER WITH DYNAMICALLY CONFIGURABLE BAND-SPLIT IN HYBRID FIBER COAX DEPLOYMENTS

PRIORITY CLAIM

This application is a continuation of U.S. patent application Ser. No. 17/307,449, filed May 4, 2021, titled "Flexible Diplexer with Dynamically Configurable Band-Split in Hybrid Fiber Coax Deployments", which claims the benefit of priority to U.S. Provisional Patent Application Ser. No. 63/020,094 titled "Flexible Diplexer with Dynamically Configurable Band-Split in Hybrid Fiber Coax Deployments", filed on May 5, 2020, which is hereby incorporated by reference as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD OF THE INVENTION

The field of the invention generally relates to digital signal processing, and more specifically to a flexible diplexer that enables a dynamically configurable band-split arrangement in hybrid fiber coax deployments.

DESCRIPTION OF THE RELATED ART

In the face of ever-increasing throughput demands, the cable industry has made strides to increase accessible upstream and downstream bandwidths. Recent generations of the Data Over Cable Service Interface Specification (DOCSIS) have evolved the transmission bandwidth allocation from predominantly downstream (DS) broadcast with a small amount of spectrum set aside for upstream (US) transmission, referred to as sub-split band, to more equitable US vs. DS bandwidth allocations, referred to as mid-split band or high-split band depending on the relative portion of the total bandwidth allocated to US communications. FIG. 1 illustrates a sub-split transmission configuration where bandwidth is set aside predominantly for DS communications, with a much smaller portion of the available bandwidth set aside for US communications. In example shown in FIG. 1, the US bandwidth is confined to frequencies below ~40 MHz. FIG. 2 illustrates a mid-split (top graph) and high-split (bottom graph) configuration with a more equitable split between downstream and upstream bandwidth, with the upstream bandwidth confined to frequencies below ~85 MHz in the mid-split band, and below ~204 MHz in the high-split band.

Central to its ongoing evolution, DOCSIS has been pushing the upper frequency limit of transmission bandwidth, moving from 1 GHz to 1218 MHz (i.e. 1.2 GHz), and continuing with operation beyond 1.2 GHz with an upper limit of 1794 MHz (i.e. 1.8 GHz), designated as Extended Spectrum DOCSIS (ESD). Standards operation out to 3 GHz and even 5 GHz are currently under consideration. Furthermore, multiple added band-split arrangements are also being considered as part of the forthcoming DOCSIS 4.0 PHY specification, as exemplified in Table 1.

TABLE 1

Proposed Band-Split Arrangements

| Proposal start (MHz) | CableLabs/Intel | | | Original | | | CommScope | | |
| --- | --- | --- | --- | --- | --- | --- | --- | --- | --- |
| | stop (MHz) | guard band (MHz) | guard band overhead | stop (MHz) | guard band (MHz) | guard band overhead | stop (MHz) | guard band (MHz) | guard band overhead |
| 204 | 258 | 54 | 26.5% | 258 | 54 | 26.5% | 258 | 54 | 26.5% |
| 300 | 370 | 70 | 23.3% | 372 | 72 | 24.0% | 378 | 78 | 26.0% |
| 396 | 490 | 94 | 23.7% | 492 | 96 | 24.2% | 498 | 102 | 25.8% |
| 492 | 602 | 110 | 22.4% | 606 | 114 | 23.2% | 624 | 132 | 26.8% |
| 684 | 834 | 150 | 21.9% | 834 | 150 | 21.9% | 864 | 180 | 26.3% |

Diplexer Design Considerations

A diplexer has historically been defined as a passive device that implements frequency-domain multiplexing (FDM). A diplexer has two ports (e.g., referred to as L and H) that are multiplexed onto a third port (e.g., referred to as S). The signals on ports L and H occupy disjoint frequency bands, and thus the signals on L and H can coexist on port S without interfering with each other. A conventional diplex filter arrangement requires a family of fixed analog filters to meet the range of band-split requirements under consideration. Each filter pair would implement a single instance of the low-/high-pass response symmetric about the center of the US/DS guard band. FIG. 3 illustrates the frequency allocations in various diplex configurations as proposed in DOCSIS 4.0. As shown in FIG. 3, a negative power spectrum indicates a DS vs. US band designation.

The presence of five filter pairs in a diplexer would seem prohibitively large, costly and require too much power for a single amplifier design. Full Duplex (FDX) designs may introduce further complications, requiring an asymmetric band-split to permit substantial overlap between US and DS band allocations, e.g., a 684 MHz US upper band limit coupled with a 258 MHz DS lower band limit as depicted in FIG. 4.

Therefore, improvements in the field of diplexer design are desired.

SUMMARY OF THE EMBODIMENTS

Various embodiments are presented of a system and method for a flexible diplexer that may include a (dynamically) reconfigurable filter pair capable of rendering a variety of band-split arrangements in a digital signal processor (DSP) backed design. As disclosed herein, various embodiments of a flexible digital diplexer design may employ DSP techniques to provide reconfigurable filter pairs, e.g. filter pairs capable of being configured, to programmably achieve a variety of band-split arrangements. The flexible diplexers may thereby incorporate and meet a larger range of band-split requirements, possibly the full range of band-split requirements in a single, programmably reconfigurable design. Configurability may be achieved by digitizing the signal at RF (employing an RF analog-to-digital converter (ADC) at either input interface of a diplexer in a diplexer/amplifier complex) after bandpass filtering and two-to-four wire conversion at the respective forward (e.g. downstream) and reverse (e.g. upstream) input interfaces. At any given time a new band-split may be obtained by updating the respective digital low-pass filter and digital high-pass filter using specified coefficient sets, which may be determined off-line and retrieved from memory for the purposes of programming the digital filters. The use of DSP also makes it possible to implement additional functionality within the diplexer/amplifier complex to accommodate various network deployment scenarios. Such functionality includes but is no limited to equalization and tilt regeneration at points along the cable segment for improved signal fidelity, self-interference cancellation to permit reduced guard bands between the upstream frequency band and downstream frequency band or band overlap between upstream and downstream in the case of full duplex, virtual segmentation of the cable plant through the use of repeaters to create a high-speed transport between dedicated endpoints utilizing the frequency range above the designated upstream/downstream bands, and/or creation of auxiliary service points to provide access to/from a small cell base station and/or Wi-Fi access point or other backhaul network stations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention may be obtained when the following detailed description of the preferred embodiment is considered in conjunction with the following drawings, in which.

Figure 1:
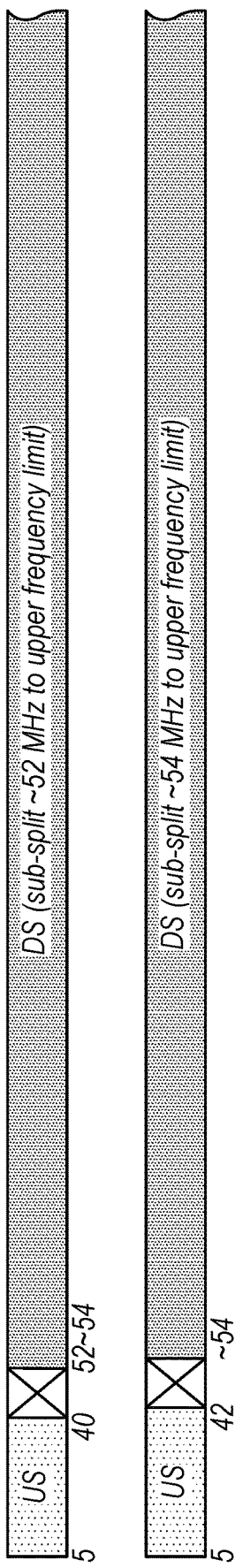
FIG. 1 illustrates a sub-split band configuration in a transmission cable.
Figure 2:
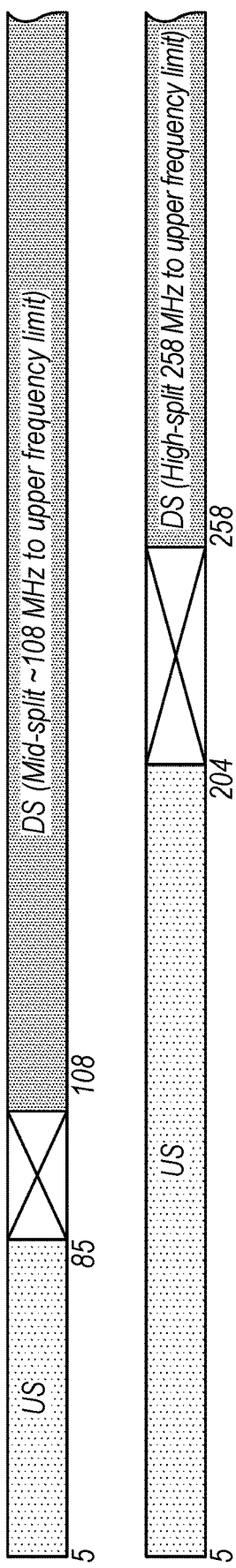
FIG. 2 illustrates mid-split band and high-split band configurations in a transmission cable.
Figure 3:
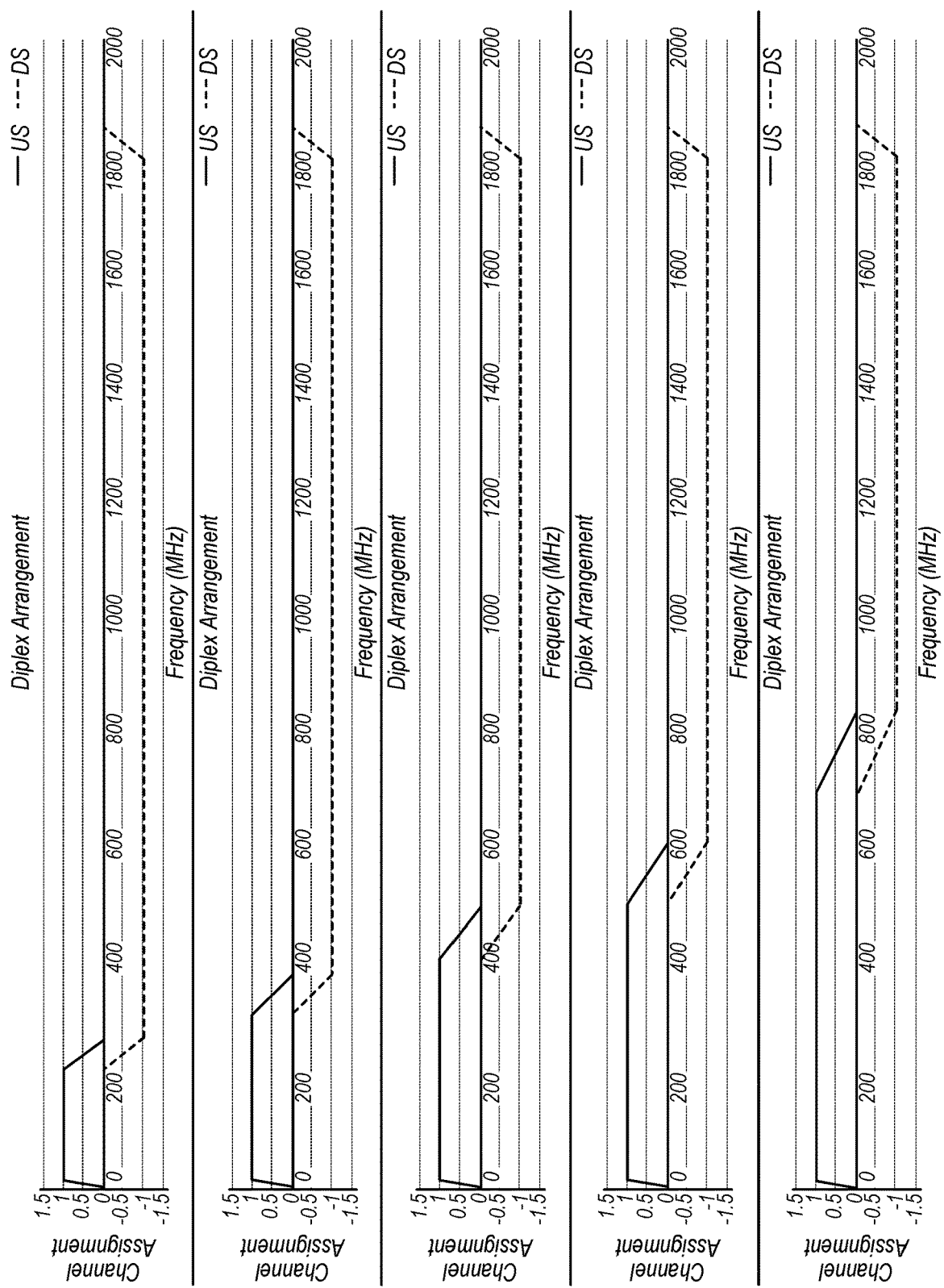
FIG. 3 illustrates the frequency allocations for various diplex configurations.
Figure 4:
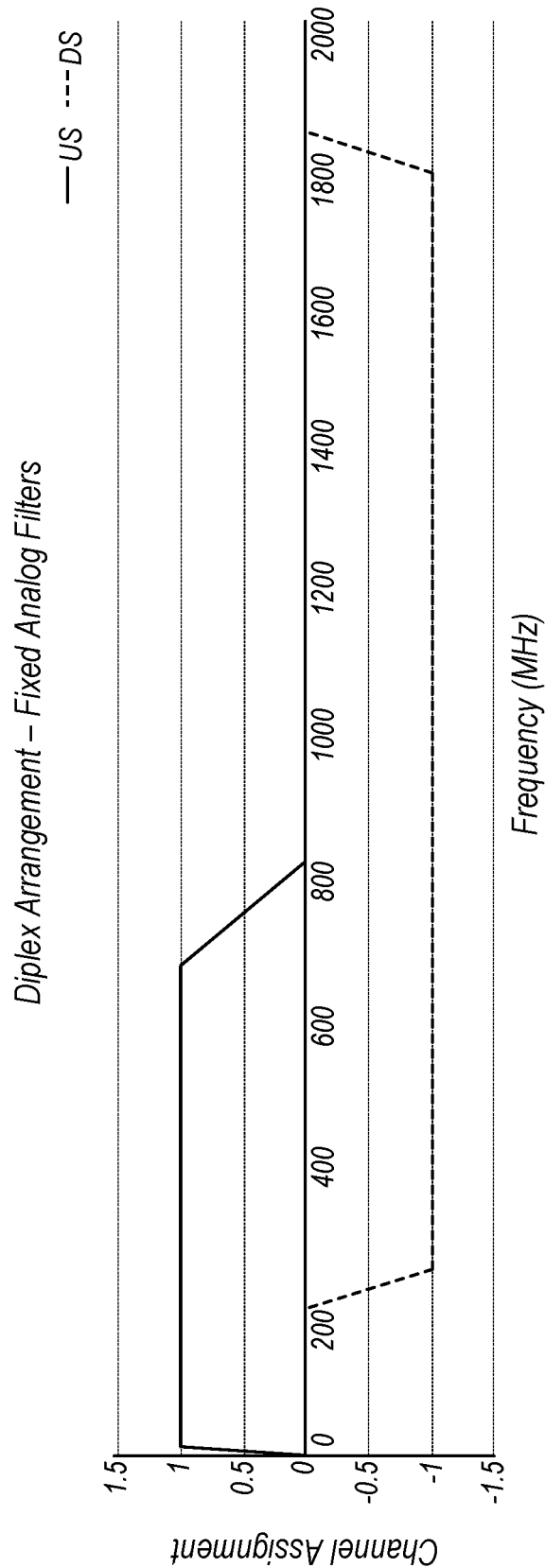
FIG. 4 illustrates the frequency allocation for a full duplex diplexer arrangement.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Acronyms

Various acronyms are used throughout the present disclosure. Definitions of the most prominently used acronyms that may appear throughout the present disclosure are provided below:

ACI Adjacent Channel Interference
ADC Analog to Digital Converter
AIC Active Interference Cancellation
ALI Adjacent Leakage Interference
BW Bandwidth
CATV Cable Television
CE Channel Estimation
CM Cable Modem
CMTS Cable Modem Termination System
CP Cyclic Prefix
DAC Digital to Analog Converter
DDC Digital Downconversion
DMR Data Memory and Routing
DOCSIS Data over Cable Service Interface Specification
DS Downstream
DSP Digital Signal Processor
DUC Digital Upconversion
EC Echo Cancellation
ESD Extended Spectrum DOCSIS
EQ Equalization
FD Full Duplex
FDD Frequency Division Duplexing
FDX Full Duplex
FFT Fast Fourier Transform FN Fiber Node
FWD Forward
HaaS Hardware as a Service
HFC Hybrid Fiber-Coax
IFFT Inverse Fast Fourier Transform
MAC Medium Access Control
MHz Mega-Hertz
OFDM Orthogonal Frequency Division Multiplexing
OLT Optical Line Terminator
PE Processing Element
PHY Physical Layer
REV Reverse
RM CP Remove Cyclic Prefix
RP Repeater
RPD Remote PHY Device
RF Radio Frequency
RS Reference Symbol
RX Receive
SC Subcarrier
SDR Software Defined Ratio
SDS Software Defined System
SIC Self-Interference Cancellation
TX Transmit
US Upstream
VS Virtual Segmentation As will be further detailed below, various embodiments of a flexible diplex arrangement may be able to meet a full range of band requirements, inclusive of those that may arise in future specification releases, e.g., reduced guard bands, additional band-splits, and/or frequency extension out to 3 or 5 GHz and/or beyond.

Hybrid Fiber-Coaxial (HFC) Deployment Scenarios

Figure 5:
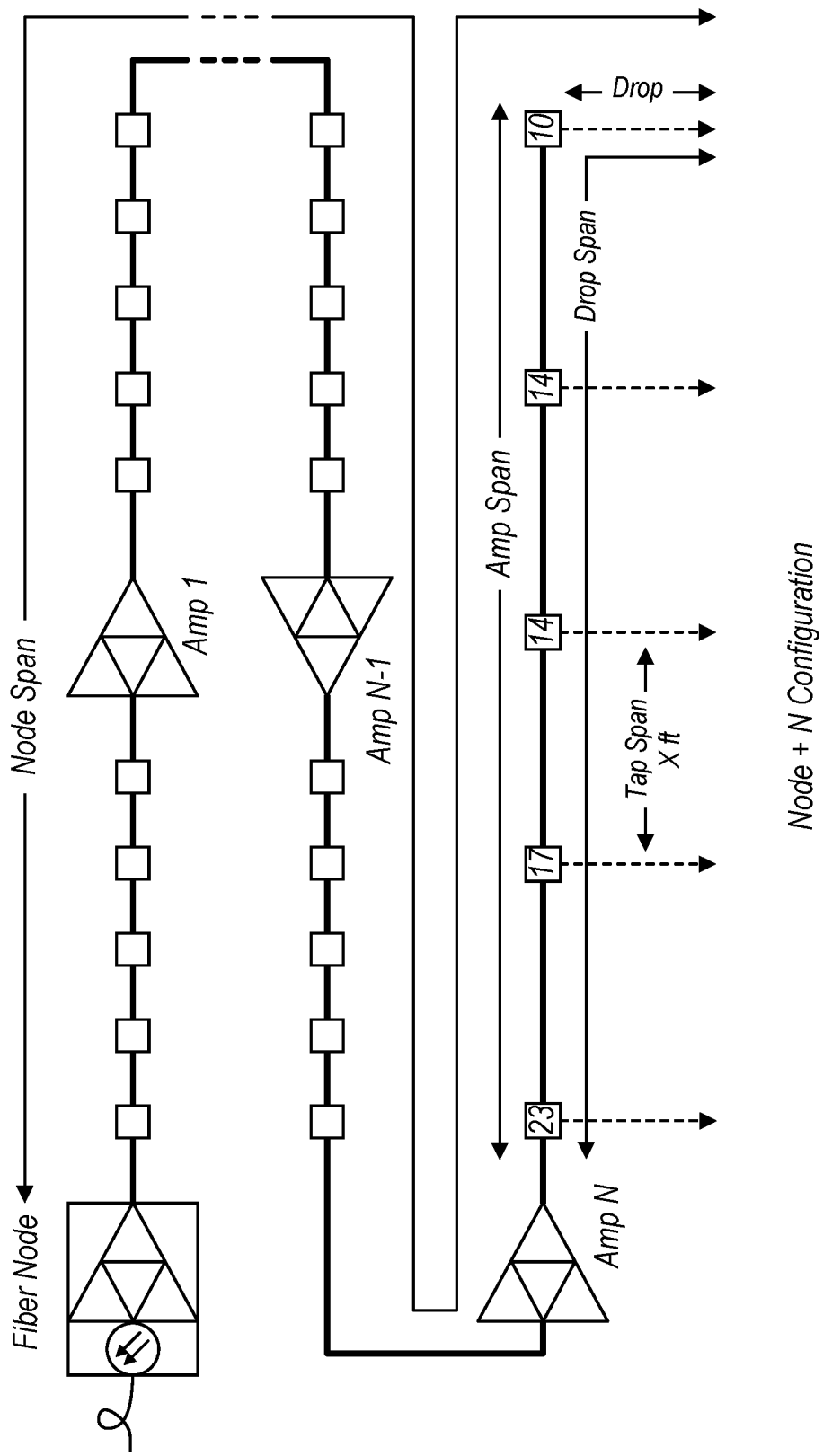
FIG. 5 illustrates a cable system configuration that includes an amplifier in a cable node and also includes multiple additional amplifiers.

A diplexer, i.e. diplex filter pair, may appear as an integral part of each amplifier found throughput the cable plant or cable system. The occurrence of amplifiers in a span, and consequently the total number of amplifiers in a given cable plant or cable system is generally reflected in the node configuration. For example, in a "Node+N" deployment, exemplified by deployments in rural and/or less densely populated suburban areas, N amplifiers may be included (or used) beyond that in the cable node itself (exemplified as the Fiber node), as illustrated in FIG. 5. As seen in FIG. 5, the taps are represented by the squares, and the drop span encompasses all of the drops from an amplifier, while a single drop is indicated at tap 10 on the far right.

Figure 6:
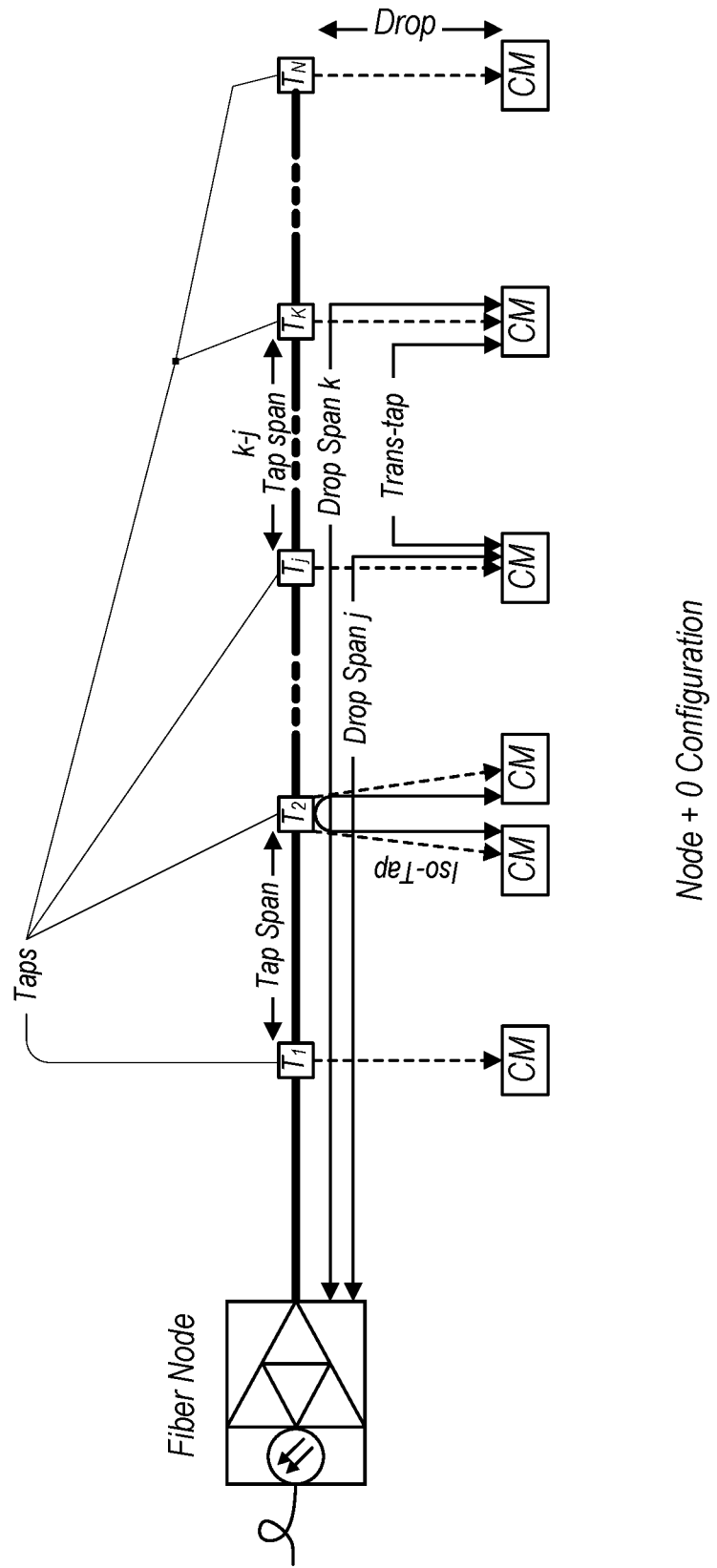
FIG. 6 illustrates a cable system configuration that includes an amplifier in a cable node and does not include additional amplifiers.

In contrast, in a "Node+0" deployment, exemplified by deployments in dense urban areas and/or other deep fiber deployments, amplifiers outside those present in the cable modems (CMs) and remote physical-layer device (RPD; exemplified as the Fiber Node) are eliminated, as illustrated in FIG. 6. To date, full duplex (FDX) operation has been relegated to "Node+0" configurations, indicative of a passive plant (e.g., no active components at taps or along the cable spans between taps as well as those to/from RPD and drops to/from CMs). As seen in FIG. 6, various spans in the cable plant are indicated by correspondingly labeled lines with arrowheads. The various dashed lines indicate potential signal paths. The curved line under tap $T_2$ in particular indicates a potential signal/interference path from one CM to another.

Diplex Filter Arrangement

To overcome many of the limitations imposed by the use of traditional diplexers, a flexible diplexer may include a reconfigurable filter pair capable of rendering a variety of band-split arrangements in a digital signal processing (DSP) backed design. In other words, as disclosed herein, various embodiments of a diplexer design may employ DSP techniques to provide reconfigurable filter pairs, e.g. filter pairs capable of being configured, to programmably achieve a variety of band-split arrangements.

Figure 7:
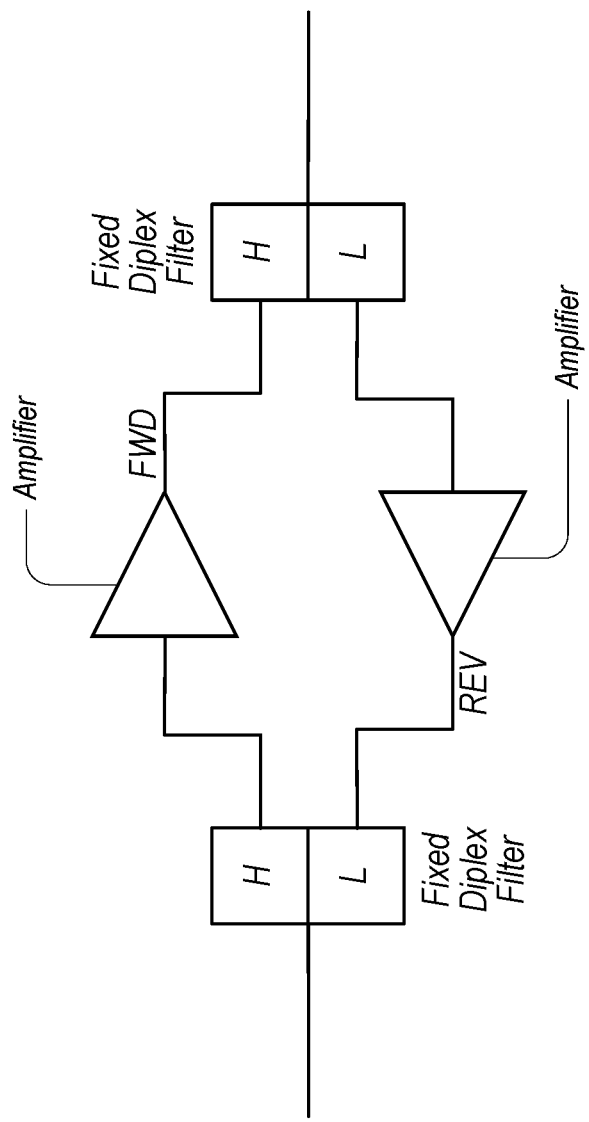
FIG. 7 illustrates a conventional amplifier design with fixed, analog diplexers.

FIG. 7 illustrates a conventional amplifier design that employs fixed, analog, i.e. non-DSP backed, diplexers appearing at the forward, FWD, (or downstream, DS) and reverse, REV, (or upstream, US) I/O interfaces. A separate filter pair is needed for each proposed band-split, including the filter pair needed to accommodate a full-duplex configuration.

Flexible Diplexer Design

Figure 8:
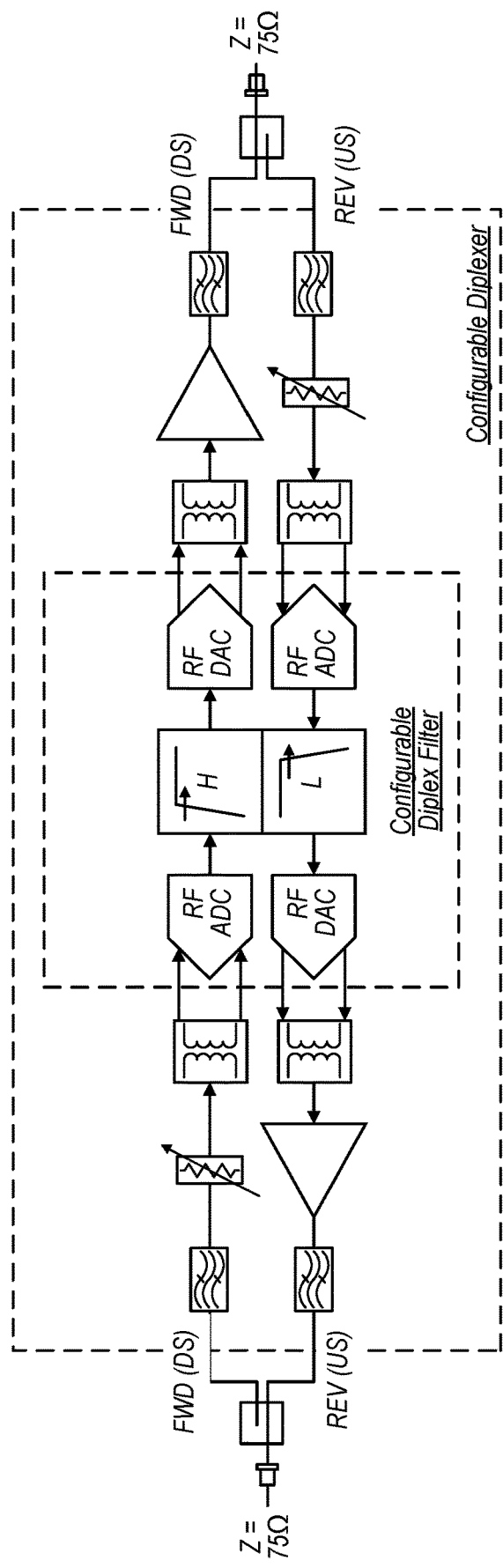
FIG. 8 illustrates a flexible amplifier design with diplexers that employ digital signal processing, according to some embodiments.

FIG. 8 illustrates an exemplary flexible diplexer according to some embodiments described herein, which may incorporate digital filters to define a host of prescribed band-splits. In contrast to conventional amplifier designs with analog diplexers, the flexible diplexers include a DSP backed design that may incorporate a larger range of band-split requirements, possibly the full range of band-split requirements in a single, reconfigurable design. As seen in FIG. 8, design configurability may be accomplished by digitizing the signal at RF (employing an RF ADC at either input interface) after bandpass filtering and two-to-four wire conversion at the respective FWD and REV input interfaces. The amplifier may not need to include strict input or output interfaces as the US and DS signals may be combined at either interface. As referenced in this context, input refers to the signal coupled in at the interface facing the cable modem (CM) or Remote PHY Device (RPD). A prescribed band-split may be rendered according to the low-/high-pass filter characteristics located at the center of the signal processing complex, indicated by the high-pass filter in the top signal chain and the low-pass filter in the bottom signal chain. The signal may be input to the configurable diplex filter via a respective ADC and output from the configurable diplex filter via a respective RF DAC, with four-to-two wire conversions at the respective FWD and REV output interfaces.

Design Reconfiguration

Updating the respective low-pass filter and high-pass filter using prescribed coefficient sets may effect (or institute) a new band-split. In some embodiments, the coefficients may be determined off-line (i.e., not under direct control of the cable plant or cable system) and may be retrieved from memory, permitting the DSP to implement one of many filters from a common allotment of DSP resources. In other words, multiple filters may be implemented from a common software defined radio (SDR) hardware complex, including those needed to accommodate FDX as needed. Configured appropriately, a field of DSP backed amplifiers may permit the necessary band overlap to bring FDX to "Node+N" deployments. In an SDR implementation, design reconfiguration may be accomplished dynamically throughout a node span as signaled from the Cable Modem Termination System (CMTS). Provided adequate DSP processing throughput, the upper band edge may be increased to extend bandwidth capability to higher frequencies, e.g. to the 3 GHz or 5 GHz upper band edge.

Dynamic System Configuration

DSP distributed throughout the cable plant (or cable system), inclusive of each amplifier location may permit the band-split to be configured dynamically as signaled by the CMTS. Selected from one of many different, e.g. previously determined and/or specified, configurations, the band-split may be assigned per fiber node span or plant/system wide. The allotment may be shifted from majority DS to majority US or any mix in-between. In some embodiments, every device visible on a node span may follow the same band-split configuration. The intent may be to address shifts in real-time bandwidth demand, shifting the allotment of US vs DS spectrum as a function of time of day, day of the week, holiday schedule, in response to inclement weather, emergency circumstance, pandemic or some other special event. Additional Functional Features in a Flexible Diplexer Arrangement Given a DSP base, additional facilities and functions may be readily accessible to incorporate anywhere along the cable plant or system. Furthermore, any unused resources may remain dark, e.g. powered-down, reserved for future use. It should also be noted that at least two different types of DSP may be distinguished for discussions of DSP as relating to the various embodiments disclosed herein. A first type of DSP may encompass performing conventional analog signal conditioning (e.g. equalization, tilt adjustment, regeneration and band splits), while a second, much more complex type of DSP may encompass, among others, the process of receiving noise and US or DS broadband signals with known formats, decoding the signal to bits, applying error correction to remove received bit errors, optionally performing add/drop on sub-channels, and regenerating a refreshed broadband signal to transmit further US or DS.

Examples of additional functionality include:
Functionality enabled by Intermediate Signal Conditioning:
  Equalization and tilt regeneration (at each amplifier site) at points along the cable segment for improved signal fidelity; and
  Self-interference cancellation (at amplifier sites as well as CM and RPD endpoints) to permit reduced guard bands between US and DS if not FDX itself (which has thus far been prohibited for "Node+N" plant deployments);
Functionality enabled by Secondary and Tertiary Band-Splits:
  Virtual Segmentation (VS) of the cable plant through the use of repeaters to create a high-speed transport between dedicated endpoints utilizing the frequency range above the designated US/DS bands; and
  Auxiliary service points (from a given amplifier site) providing access to/from a small cell base station or Wi-Fi access point or other backhaul facilities.
The above features are further described below.

Intermediate Signal Conditioning

As mentioned above, a DSP-backed design may be further extended to provide signal conditioning to mitigate adverse effects due to the channel itself, as well as to component drift/aging. First, signal conditioning with no explicit knowledge of the underlying symbol structure and pilot schedule may be considered. US/DS signal fidelity may be enhanced by re-equalizing the signal at intermediate amplifier locations. An OFDM symbol represents a form of data encapsulation. The frequency domain symbol contents at any receiver amplifier in the network reflect the original data set impaired by the channel response encountered since the preceding transmit amplifier. Provided the assigned cyclic prefix (CP) is longer than the channel delay spread, then the channel response from amplifier-to-amplifier may be compensated by a single tap equalizer per subcarrier, further described below. Methods of self-interference cancellation may be added to improve dynamic signal range or otherwise extend the tolerable span from amplifier-to-amplifier, thereby minimizing plant investment, especially given the need to account for additional signal attenuation in coax at higher frequencies, as operational needs push beyond 3 or 5 GHz. Additional digital signal processing at existing amplifier sites may help counteract the increasing loss of signal fidelity due to added attenuation at higher frequencies.

Figure 9:
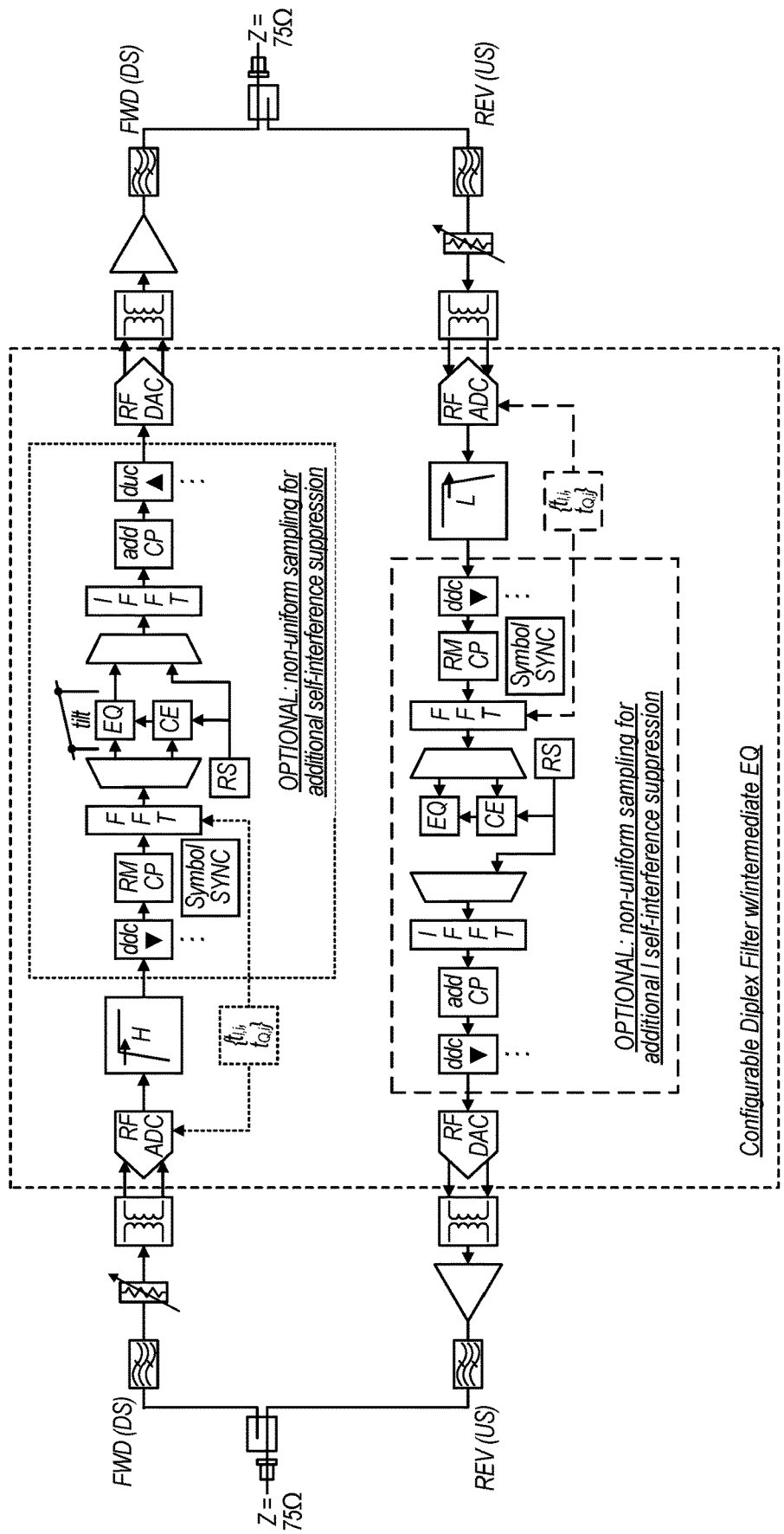
FIG. 9 illustrates a flexible amplifier design with diplexers that employ digital signal processing and implement additional signal processing features, according to some embodiments.

Re-equalization and Signal Tilt—A more complex approach capable of demodulating to bits with knowledge of the underlying symbol structure and pilot schedule may further be considered. Thus, provided knowledge of the US/DS schedule, i.e. sub-channel BWs, subcarrier (SC) allocation, pilot schedule and associated reference signals (RS), the data-bearing SCs may be re-equalized subsequent to: digital downconversion (DDC) applied per sub-channel, Cyclic Prefix (CP) removal, and Fourier Transform (FFT) using frequency domain techniques (which are generally included in a typical receiver design.) The DS tilt may additionally be reapplied while processing in the frequency domain. The signal may be returned to the time domain via inverse Fourier Transform (IFFT). The CP and window taper may be restored as applicable, followed by digital up conversion (DUC) applied per sub-channel as depicted in FIG. 9. As shown in FIG. 9, RS is representative of reference signals particular to the OFDM signal. Symbol Sync is for time-aligning the Fourier Transforms to the sampled symbols. The Fourier Transforms (FFT and IFFT) may use complex math on the complex samples. The RF ADC produces In-phase and Quadrature (complex) samples at a set of time points $\{tIi, tQi\}$. The time points may be generated in the digital circuits (HyperX) and may be time-wise uniform or optionally non-uniform—for additional self-interference suppression. It should be noted that desynchronized interference may generally appear as random noise to the main signal processing.

Self-Interference

Figure 10:
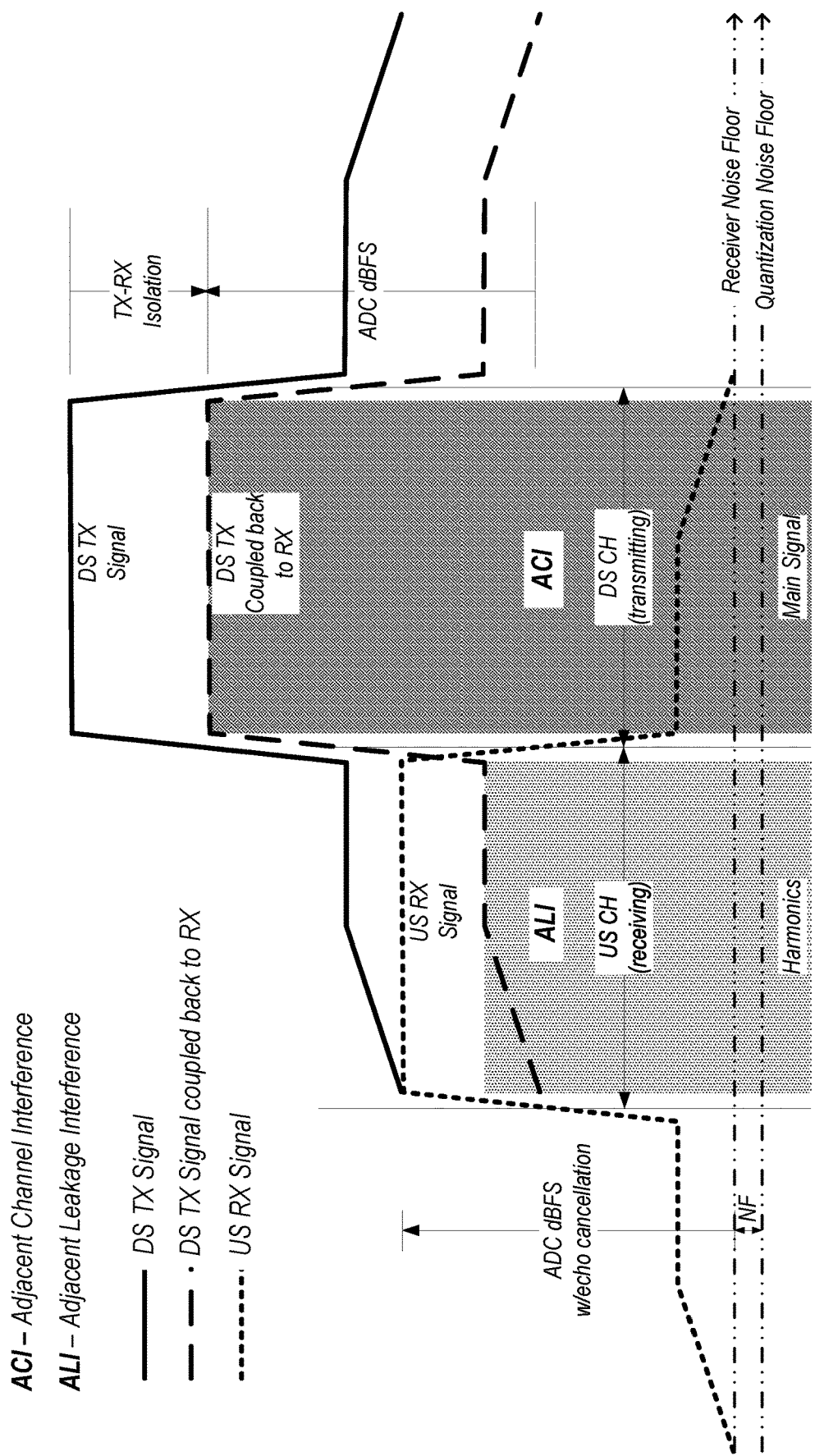
FIG. 10 shows an exemplary signal diagram illustrating adjacent channel interference (ACI) and adjacent leakage interference (ALI) scenarios.

Replacing the fixed analog diplex filters with digital processing may give rise to the potential of the transmit signal, traveling in one direction, coupling to the receive signal, traveling in the opposite direction. This coupling may manifest as unwanted self-interference due to sidelobe energy attributed to intermodulation distortion at the amplifier output entering the cable plant unfiltered in the form of adjacent leakage interference (ALI). The disparity in signal levels as seen at the amplifier inputs and their corresponding outputs may additionally give rise to unwanted adjacent channel interference (ACI) as the FWD (DS) transmitter output is coupled/reflected back to the REV (US) receive path. Likewise, the REV (US) transmitter output may be coupled/reflected back to the FWD (DS) receive path. The above mentioned effects are illustrated in FIG. 10, the ALI and ACI indicated in respective shaded areas.

Figure 11:
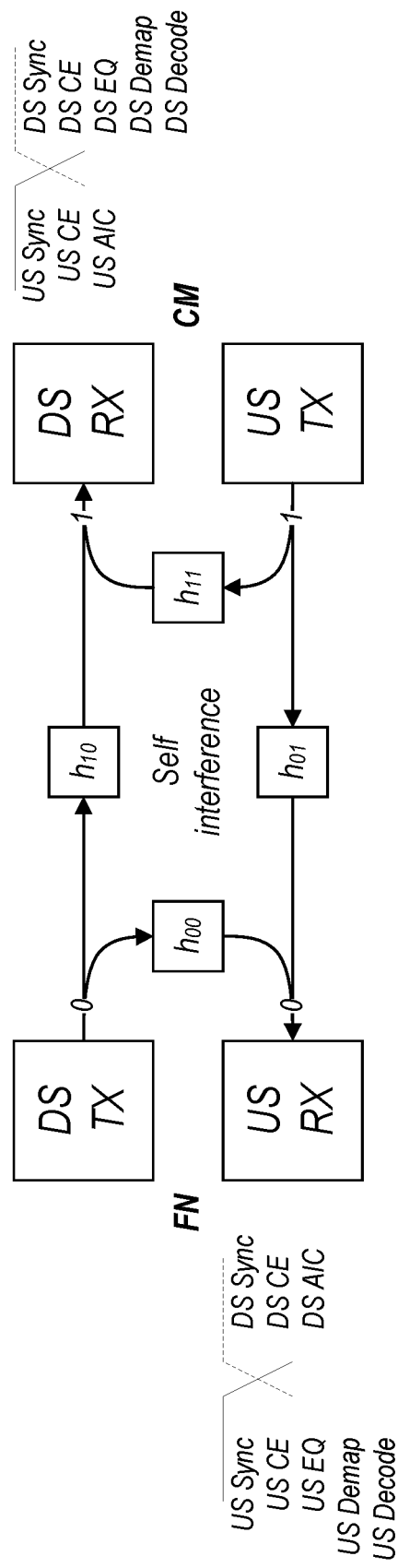
FIG. 11 shows an exemplary system diagram illustrating potential DOCSIS DS/US self-interference scenarios.
Figure 12:
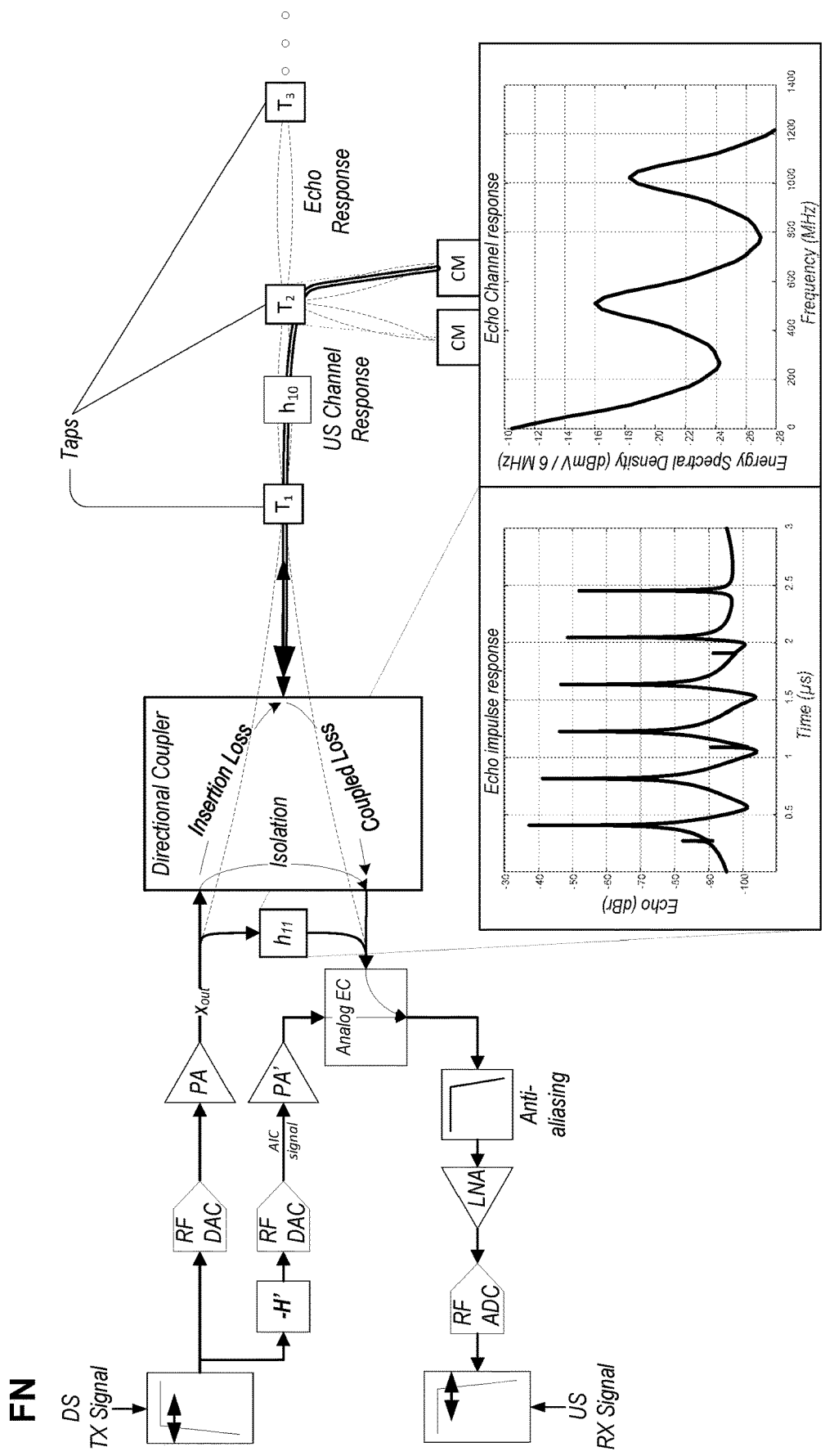
FIG. 12 shows an exemplary system diagram illustrating DS echo response and analog echo cancellation.

Self-Interference Scenarios—The DS/US self-interference scenarios are further illustrated through the simplified exemplary system diagram in FIG. 11. The DS TX signal from a Fiber Node (FN) may couple back to the corresponding US RX in the FN according to the channel impulse response, $h_{00}$. In a similar fashion, the US TX from a cable modem has the potential to couple to its own or an adjacent DS RX according to the channel impulse response, $h_{11}$. However, with the introduction of FDX, DOCSIS defines a sounding method used to identify groups of cable modems, called Interference Groups, which would interfere with each other if they were allowed to transmit and receive at the same time in a given subband. TX/RX opportunities in a given subband are scheduled such that TX and RX opportunities do not overlap among CMs belonging to the same interference group. This consideration largely confines the SIC problem to the FN, given the availability of a separate mechanism to mitigate the problem on the CM side. Referring to FIG. 12, an understanding of the DS echo response may be drawn by examining the distribution of taps in a given plant configuration (illustrated in FIG. 12) where each tap represents a potential echo source given the likelihood of an impedance mismatch at the tap location. The distribution of taps seen in the DS direction results in a train of echoes spaced proportionally to the roundtrip delay from the FN to each tap location. Plots of the time domain impulse response ($h_{11}$) and the corresponding frequency domain channel response are shown in FIG. 12.

Figure 13:
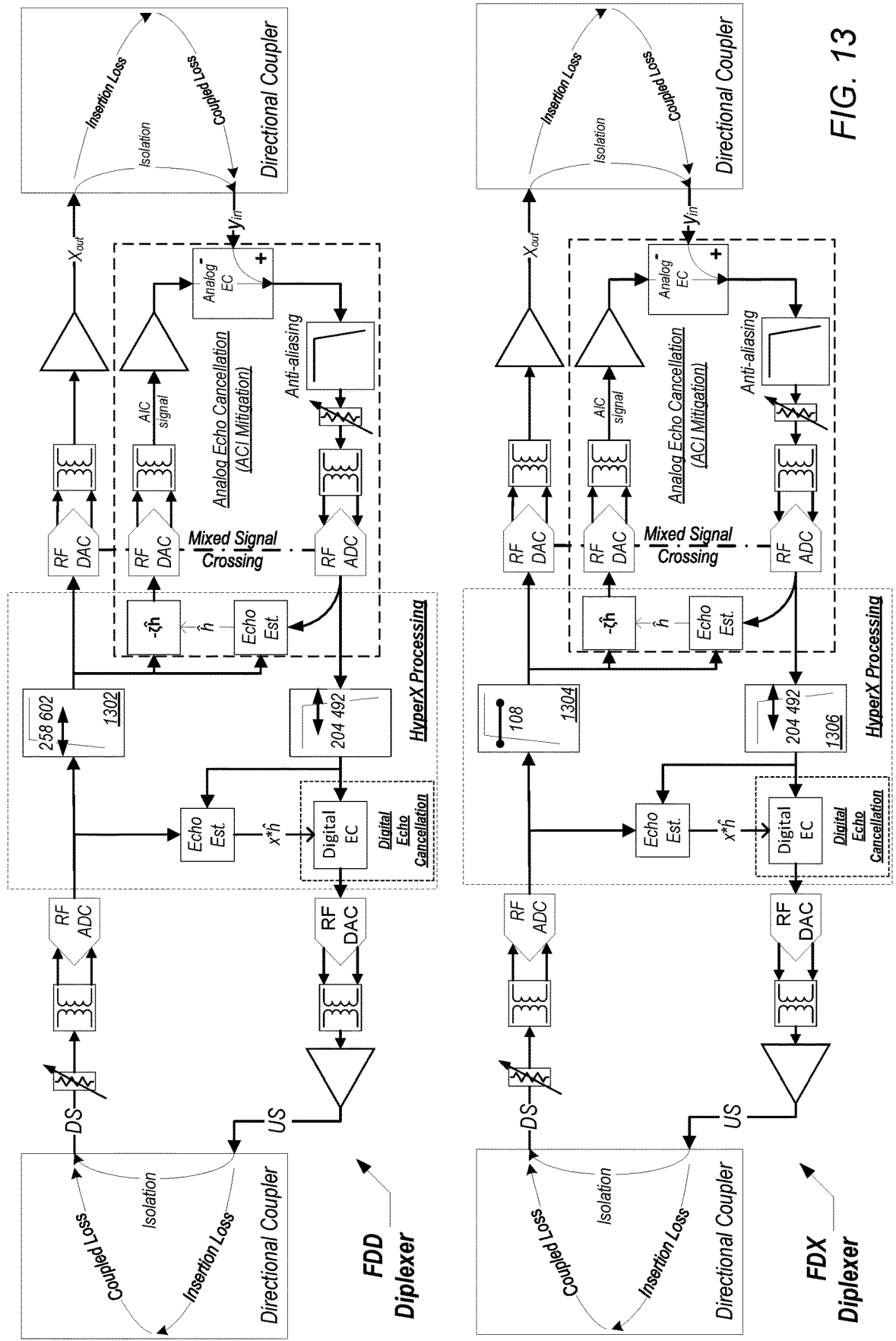
FIG. 13 shows an exemplary circuit diagram illustrating flexible diplexers implemented with active interference cancellation (ACI), according to some embodiments.

Harmful self-interference effects may be mitigated via a mix of analog and digital techniques employed in a configurable FDD or FDX amplifier. The principal goal with Active Interference Cancellation (AIC) is to suppress the interfering signal to a level that may be passed linearly by the analog to digital converter (ADC). Given the HyperX Processor or a similar architecture, analog cancellation may be accomplished by passing a complementary signal (i.e., a signal that is 180° out of phase with the interfering signal) via an auxiliary transmitter. Provided to a combiner at the RX input, this cancellation signal removes the interfering DS signal energy, thereby suppressing its impact on data conversion and subsequent digital processing. Any residual echo may be mitigated by a secondary, purely digital echo cancellation stage. FIG. 13 provides a simplified circuit diagram of an AIC-equipped flexible diplexer both in an FDD and an FDX deployment configuration. It should be noted that the FDD and FDX deployment configurations are distinguished only by the presence/absence of variability in the DS facing high-pass filters 1302 and 1304, respectively. In the FDD case, the HPF cutoff frequency is made variable (indicated as 258 to 602) to enable a variety of band-splits. In the FDX case, the HPF cutoff remains fixed (indicated as 108) to enable differing band overlaps by varying the cutoff frequency in the US facing low-pass filter (LFP) 1306. It is well known that that ADCs have a finite dynamic range, therefore the analog cancellation is performed to reduce the interference to obtain the desired signals in the range of the ADC. The digital interference cancellation may then eliminate the residual interference.

The HyperX processor contributes uniquely given the mix of configurable processing elements (PEs) embedded in an array of data memory and routing (DMRs). Multiple PEs may be assigned as needed to estimate the echo response, mostly as part of the analog EC stage, and optionally as part of any residual digital EC invoking DMRs as needed to support the PE processing. The PE resources may also serve in convolving the DS TX signal with the estimated echo response to feed the AIC signal output, again with DMR support as needed. Digital echo cancellation may involve similar convolution and signal combining steps between the DS TX and US RX signals.

The DMRs may play an added role as a delay line feeding the auxiliary AIC signal according to the response determined during channel estimation. As illustrated in Table 2, the DMR memories provide sufficient time resolution to define the echo response corresponding interference bandwidths approaching 600 MHz with as little as a 1.15 GHz processor clock. Combined with appropriate analog and mixed signal components, e.g. ADCs and DACs, the HyperX processor may play a role in a self-interference cancellation solution that may be configured to accommodate a variety of band-splits/band-sets and signal bandwidths.

TABLE 2

AIC Delay Line Requirements
Required Delay Line Spacing

| FDX Bandset | Upstream | | Downstream | | Echo | | min |
|---|---|---|---|---|---|---|---|
| | fl (MHz) | fh (MHz) | fl (MHz) | fh (MHz) | BW (MHz) | Resolution (ns) | clk (GHz) |
| 1 | 85 | 204 | 108 | 1794 | 96 | 5.21 | 0.19 |
| 2 | 85 | 300 | 108 | 1794 | 192 | 2.60 | 0.38 |
| 3 | 85 | 396 | 108 | 1794 | 288 | 1.74 | 0.58 |
| 4 | 85 | 492 | 108 | 1794 | 384 | 1.30 | 0.77 |
| 5 | 85 | 684 | 108 | 1794 | 576 | 0.87 | 1.15 |

Virtual Segmentation

Figure 14:
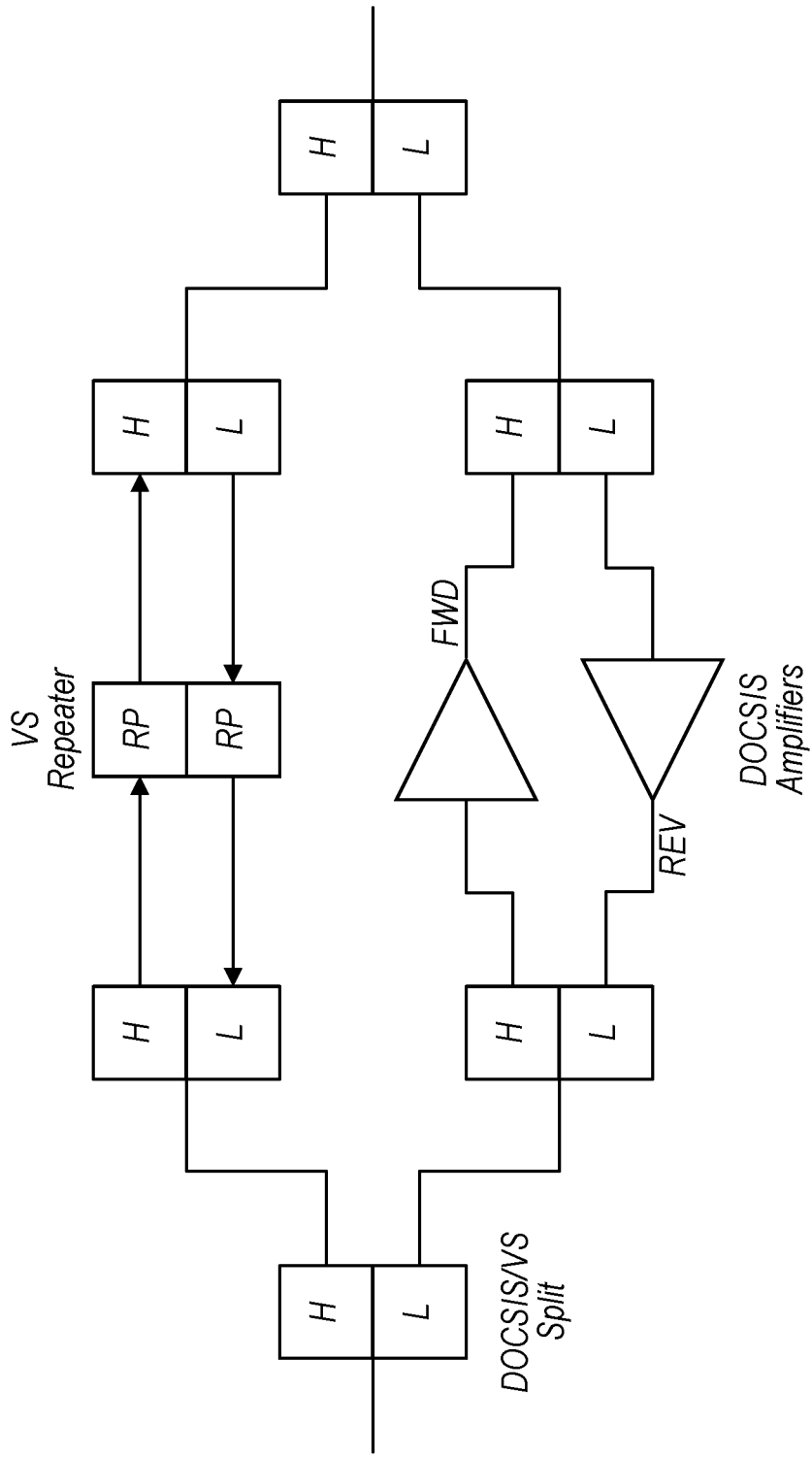
FIG. 14 illustrates an amplifier design with diplexers and spectrum allocation with virtual segmentation.

VS of the cable plant (or system) may be accomplished via a secondary band-split, followed by a tertiary split to separate the VS US and VS DS, as depicted in FIG. 14.

Figure 15:
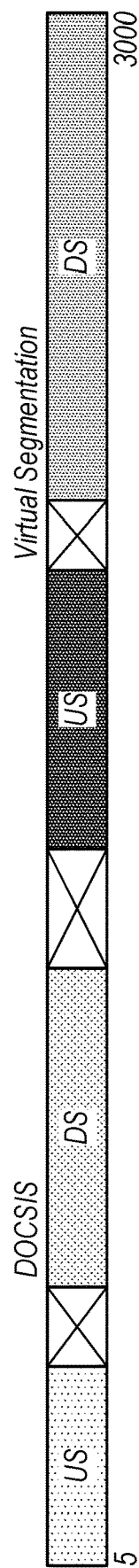
FIG. 15 illustrates one example of spectrum allocation with virtual segmentation.

Secondary Band-Split—Positioned above the prescribed DOCSIS upper band edge, e.g. 1 GHz, 1.2 GHz or 1.8 GHz, Virtual Segmentation (VS) provides a dedicated transport from the Fiber Node (FN) to the RPD with limited additional fiber outlay. Implemented as an overlay service, VS is invisible to underlying broadcast and cable modem service operation. VS acts as a repeater, bypassing the amplifier and instead regenerating the signal seen on an input port before multiplexing again with the amplified DOCSIS output. An example of spectrum allocation with VS is illustrated in FIG. 15. The secondary band-split separates the DOCSIS signal (bottom signal path from the DOCSIS/VS split) from the virtual segment signal (upper signal path from the DOCSIS/VS split), with the tertiary split in the upper signal path separating the US and DS portions for the respective repeaters. The required signal processing may be as modest as that described to re-equalize the signal at intermediate points and ranging upward in complexity to that needed to demodulate and decode the VS sub-channels back to user bits, then re-encode and re-modulate.

Figure 16:
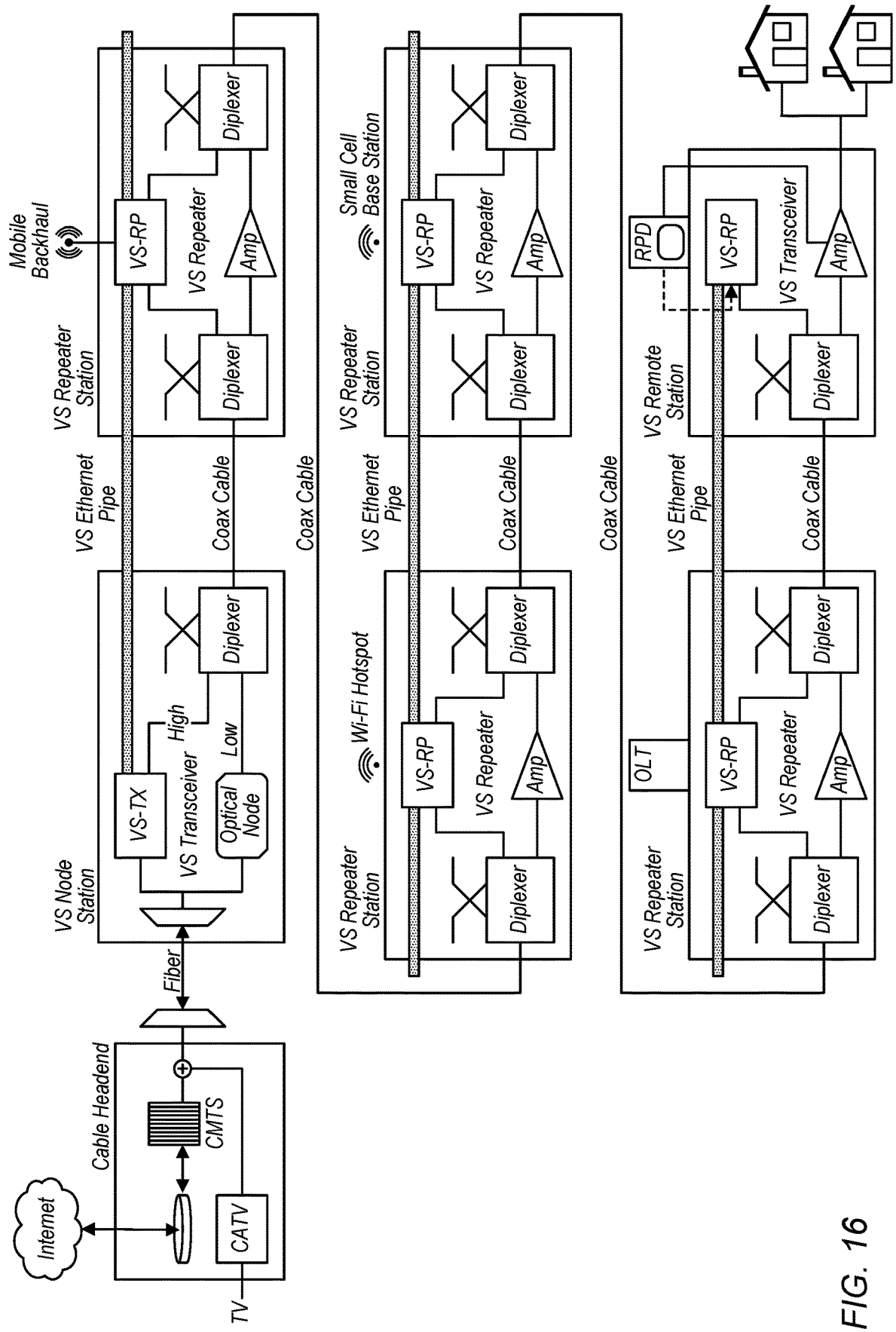
FIG. 16 illustrates a cable system with multiple auxiliary service access points deployed along the cable strand.

Auxiliary Service Points—If demodulated to bits, one or all of the VS sub-channel streams may be directed to another access network, e.g., to Wi-Fi or 3GPP, forming auxiliary service access points. The auxiliary service points may further lend themselves to an SDR implementation. Deployed as needed along the cable strand, the needs of a Wi-Fi Access Point, Small-Cell Base Station, Low-Power Broadcast Transmitter, and/or Backhaul Transceiver may be accommodated alongside VS transmit/receive (TX/RX) digital signal processing, with the added flexibility to adapt the access protocol to changing traffic demands as well as advances in to the underlying standards specification, e.g. Wi-Fi 6, 3GPP 5G NR, ATSC 3.x. A simplified system diagram of an exemplary cable system implemented with virtual segmentation is illustrated in FIG. 16. Each VS repeater station may include flexible diplexers implemented according to the various embodiments described herein.

Inline Network Processing

Demodulating to bits at intermediate service points may enable the potential for inline, real-time network processing. Examples of inline network processing accessible at intermediate service points might include:

Multi-layer, multi-service switching and routing, between as well as within defined service access points;
Security—firewall, VPN identification, policy enforcement and statistics gathering, encryption, etc.;
Classification—access control, filters, billing, etc.; and
Packet editing—fragmentation, replication, mirroring, address translation, robust header compression, etc.

One aim with an SDR approach is to enable an ongoing progression in DSP capability. An SDR approach may provide adequate processing throughput for a range of deployment scenarios, ongoing upper band extensions, increased signal fidelity (especially in light of higher frequency use), ongoing evolution in prescribed band-splits, and ESD half-duplex/full-duplex capabilities. A DSP-backed amplifier provides a flexible design approach enabling Hardware as a Service (HaaS) with the possibility of remote updates based on an incremental fee schedule with rolling feature deployment. HaaS may be enabled by over-provisioning the DSP complex. Periodic maintenance charges may be applied to ensure early access to the latest features, e.g. bandwidth extension, intermediate re-equalization, and/or self-interference cancellation.

Potential Benefits of DSP-Backed SDR-Based Diplexer Designs

Embodiments of DSP-backed amplifiers with flexible diplexers as disclosed herein may provide diverse system benefits to HFC network operators, for example as outlined below.

Flexible Diplex Arrangement:

Introduces signal processing at amplifier locations to vary the band-split on command from the CMTS or some other centralized entity:
 Permits multiple band-split configurations, as agreed upon via the DOCSIS standardization process.
 Additionally, permits a rendering of FDX band allocations, also prescribed by the standard.
 The chosen band-split may be confined to a node span, varying RPD-by-RPD or signaled throughout the cable plant. Any accessible RPDs and CMs will be instructed to follow suit.
 Given a flexible band-split arrangement, future configurations are enabled through use of revised filter coefficient sets at each DSP backed amplifier site.
 Additional band-splits may be defined after the initial standards release.
 The guard bands between US and DS allocations can be varied beyond initial standards release.

Dynamically Configurable Band-Split

Given a DSP backed plant configuration, the band-split may be configured dynamically to account for shifts in usage patterns as a function of use (real-time) load demands, time of day, day of the week, scheduled holiday, inclement weather condition, emergency circumstance, pandemic or other special events or circumstances.
 The shift in bandwidth allocation may be signaled per node span from each RPD or globally from a common CMTS.
 The allotment of US vs DS bandwidth may be varied from majority DS to majority US, to predominantly DS with minimal US (or vice-versa), or any mix in between.
 The proportion of bandwidth allotted for FDX can be varied, again based on throughput demand.
 Self-Interference Cancellation—Given the disparity in signal levels at amplifier inputs and outputs, ACI may be mitigated through additional (or added) signal processing. Given the potential for sidelobe energy passing unfiltered due to intermodulation distortion at the amplifier output, ALI may be mitigated through additional (added) signal processing.

Intermediate Signal Conditioning

Given DSP-backed amplifiers, some level of signal conditioning may be introduced at intermediate points, leveraging the data encapsulation afforded by the OFDM symbol representation to improve downstream signal fidelity as the signal is passed amplifier-to-amplifier. Examples of such signal conditioning include:
 Re-equalization: Given the bandwidth allocation, signal dimensions (e.g. FFT size, CP and roll-off lengths), and pilot schedule, the channel response encountered from the previous transmitter may be estimated, equalized on a per symbol basis, the equalized pilots re-inserted, the CP reapplied and rolled off, then passed on to the output amplifier.
 Self-interference cancellation: given the disparity in signal levels at amplifier inputs and output, signal processing may be added to mitigate ACI. Given the potential for sidelobe energy passing unfiltered due to intermodulation distortion at the amplifier output, signal processing may be added to mitigate ALI.
 Active tradeoff: a tradeoff between the level of DSP deployed per amplifier site and the need for additional amplifiers to achieve a desired span and range in extended signal bandwidth, e.g. 3 GHz or 5 GHz becomes possible. Signal processing may thus be used to improve signal fidelity and extend the band support to 3 GHz or 5 GHz without the need for additional amplifiers or closer separation between amplifiers.

Virtual Segmentation

Secondary Band-Split
 Introduction of a secondary configurable filter pair to separate a proprietary VS transport from the standard DOCSIS US/DS. Tuning of the filter coefficients to accommodate a range in DOCSIS upper band edge. Passing the VS signal amplifier-to-amplifier, perhaps separate from the DOCSIS US/DS.
 Introduction of a third filter pair to separate VS US from DS. Tuning the filter coefficients according to the VS USIDS bandwidth allocations.
 Repeater—A full signal repeater, implemented in both the US and DS directions as applicable, may be added to extend the improvements gained with intermediate signal conditioning described above. Beyond re-equalization, the repeater may also be responsible for demodulating/decoding the OFDM symbol contents to user data bits, then re-encoding/re-modulating the signal to ensure no error propagates between amplifiers. The need for this level of reconditioning may be balanced against the DSP capability costs or power consumption as full demodulation/decoding represents a substantially larger computational load than re-equalization alone.

Auxiliary Service Points
 Additional signal processing may be introduced at select amplifier locations to demodulate and decode/re-encode and re-modulate the VS transport to and/or from user bits. Those bits may be directed to and/or from an auxiliary access network, e.g. Wi-Fi, 5G small cell, ATSC low power transmitter.
 Update of the underlying auxiliary service protocol becomes possible, given an SDR platform.

Scalable Processing Resources

Provisioning of an overabundance of processing resources, capable of satisfying an upper band in DSP throughput capability, to enable Hardware as a Service (HaaS).
 Possibility of ongoing design evolution, invoking resources as needed to accommodate added features, for example those listed below in order of complexity:
 Reconfigurable diplex filtering;
 Intermediate re-equalization and tilt;
 Self-interference cancellation;

Extended bandwidth;
Virtual Segmentation; and/or
Virtual Segmentation with Auxiliary Service Points.

Although specific embodiments have been described above, these embodiments are not intended to limit the scope of the present disclosure, even where only a single embodiment is described with respect to a particular feature. Although the embodiments above have been described in considerable detail, numerous variations and modifications will become apparent to those skilled in the art once the above disclosure is fully appreciated. It is intended that the following claims be interpreted to embrace all such variations and modifications.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A dynamically configurable diplexer, the diplexer comprising:
   an upstream input port and an upstream output port configured for upstream communications over a cable network;
   a downstream input port and a downstream output port configured for downstream communications over the cable network;
   a pair of digital filters comprising a first digital filter coupling the upstream input port to the upstream output port and a second digital filter coupling the downstream input port to the downstream output port, wherein the pair of digital filters is programmatically configurable to simultaneously allocate a first portion of a total bandwidth of signals passing through the diplexer to the upstream communications and a second portion of the total bandwidth of the signals passing through the diplexer to the downstream communications; and
   control circuitry comprising:
      an analog echo cancellation stage configured to mitigate interfering downstream signal energy to suppress an impact of the interfering downstream signal energy on data conversion and on subsequent digital processing; and
      a digital echo cancellation stage configured to mitigate residual interfering downstream signal energy that remains following mitigation performed by the analog echo cancellation stage.

2. The diplexer of claim 1, wherein the first digital filter is a digital low-pass filter and the second digital filter is a digital high-pass filter.

3. The diplexer of claim 1, wherein the pair of digital filters are configured to operate according to a programmably configured set of filter coefficients.

4. The diplexer of claim 3, wherein the programmably configured set of filter coefficients is retrieved from memory.

5. The diplexer of claim 1, further comprising:
   a first analog-to-digital converter (ADC) configured convert an analog upstream signal received at the upstream input port to a corresponding digital upstream signal and provide the digital upstream signal to the first digital filter;
   a second ADC configured convert a analog downstream signal received at the downstream input port to a corresponding digital downstream signal and provide the digital downstream signal to the second digital filter;
   a first digital-to-analog converter (DAC) configured to convert a filtered digital upstream signal received from the first digital filter to a corresponding analog upstream signal and provide the analog upstream signal to the upstream output port; and
   a second DAC configured to convert a filtered digital downstream signal received from the second digital filter to a corresponding analog downstream signal and provide the analog downstream signal to the downstream output port.

6. The diplexer of claim 1, further comprising:
   a first amplifier configured to amplify an upstream signal of the upstream communications and provide the amplified upstream signal to the upstream output port; and
   a second amplifier configured to amplify a downstream signal of the downstream communications and provide the amplified downstream signal to the downstream output port.

7. The diplexer of claim 1,
   wherein the control circuitry is configured to perform operations comprising one or more of:
      equalization and tilt regeneration;
      self-interference cancellation; and
      signal reconditioning.

8. A network node station comprising:
   a bidirectional port for upstream and downstream communications; and
   a diplexer comprising:
      an upstream input port and an upstream output port configured for upstream communications via the bidirectional port;
      a downstream input port and a downstream output port configured for downstream communications via the bidirectional port;
      a pair of digital filters comprising a first digital filter coupling the upstream input port to the upstream output port and a second digital filter coupling the downstream input port to the downstream output port, wherein the pair of digital filters is programmably configurable to allocate a first portion of a total bandwidth of signals passing through the diplexer to the upstream communications and allocate a second portion of the total bandwidth to the downstream communications; and
   control circuitry comprising:
      an analog echo cancellation stage configured to mitigate interfering downstream signal energy to suppress an impact of the interfering downstream signal energy on data conversion and on subsequent digital processing; and
      a digital echo cancellation stage configured to mitigate residual interfering downstream signal energy that remains following mitigation performed by the analog echo cancellation stage.

9. The network node station of claim 8, wherein the pair of digital filters are configured to operate according to a programmably configured set of filter coefficients.

10. The network node station of claim 9, wherein the programmably configured set of filter coefficients is retrieved from memory.

11. The network node station of claim 8, further comprising:
- a first analog-to-digital converter (ADC) configured convert an analog upstream signal received at the upstream input port to a corresponding digital upstream signal and provide the digital upstream signal to the first digital filter;
- a second ADC configured convert a analog downstream signal received at the downstream input port to a corresponding digital downstream signal and provide the digital downstream signal to the second digital filter;
- a first digital-to-analog converter (DAC) configured to convert a filtered digital upstream signal received from the first digital filter to a corresponding analog upstream signal and provide the analog upstream signal to the upstream output port; and
- a second DAC configured to convert a filtered digital downstream signal received from the second digital filter to a corresponding analog downstream signal and provide the analog downstream signal to the downstream output port.

12. The network node station of claim 8, further comprising:
- a first amplifier configured to amplify an upstream signal of the upstream communications and provide the amplified upstream signal to the upstream output port; and
- a second amplifier configured to amplify a downstream signal of the downstream communications and provide the amplified downstream signal to the downstream output port.

13. The network node station of claim 8, further comprising:
wherein the control circuitry is configured to perform operations comprising one or more of:
  equalization and tilt regeneration;
  self-interference cancellation; and
  signal reconditioning.

14. The network node station of claim 8,
wherein the first digital filter is a digital low-pass filter and the second digital filter is a digital high-pass filter.

15. A wired communication device, comprising:
a non-transitory computer-readable memory medium;
one or more processors communicatively coupled to the non-transitory computer-readable memory medium; and
a diplexer configured to facilitate upstream and downstream communications of the wired communication device, the diplexer comprising:
  an upstream input port and an upstream output port configured for the upstream communications;
  a downstream input port and a downstream output port configured for the downstream communications; and
  a pair of digital filters comprising a first digital filter coupling the upstream input port to the upstream output port and a second digital filter coupling the downstream input port to the downstream output port, wherein the pair of digital filters is programmably configurable to allocate a first portion of a total bandwidth of signals passing through the diplexer to the upstream communications and allocate a second portion of the total bandwidth to the downstream communications; and
control circuitry comprising:
  an analog echo cancellation stage configured to mitigate interfering downstream signal energy to suppress an impact of the interfering downstream signal energy on data conversion and on subsequent digital processing; and
  a digital echo cancellation stage configured to mitigate residual interfering downstream signal energy that remains following mitigation performed by the analog echo cancellation stage.

16. The wired communication device of claim 15, wherein the first digital filter is a digital low-pass filter and the second digital filter is a digital high-pass filter.

17. The wired communication device of claim 15,
wherein the pair of digital filters are configured to operate according to a programmably configured set of filter coefficients, and
wherein the programmably configured set of filter coefficients is retrieved from memory.

18. The wired communication device of claim 15, further comprising:
- a first analog-to-digital converter (ADC) configured convert an analog upstream signal received at the upstream input port to a corresponding digital upstream signal and provide the digital upstream signal to the first digital filter;
- a second ADC configured convert a analog downstream signal received at the downstream input port to a corresponding digital downstream signal and provide the digital downstream signal to the second digital filter;
- a first digital-to-analog converter (DAC) configured to convert a filtered digital upstream signal received from the first digital filter to a corresponding analog upstream signal and provide the analog upstream signal to the upstream output port; and
- a second DAC configured to convert a filtered digital downstream signal received from the second digital filter to a corresponding analog downstream signal and provide the analog downstream signal to the downstream output port.

19. The wired communication device of claim 15, further comprising:
- a first amplifier configured to amplify an upstream signal of the upstream communications and provide the amplified upstream signal to the upstream output port; and
- a second amplifier configured to amplify a downstream signal of the downstream communications and provide the amplified downstream signal to the downstream output port.

20. The wired communication device of claim 15,
wherein the control circuitry is configured to perform operations comprising one or more of:
  equalization and tilt regeneration;
  self-interference cancellation; and
  signal reconditioning.

\* \* \* \* \*